April 15, 1952 — J. A. C. SILBERMAN — 2,593,064
FASTENER
Filed March 19, 1949 — 2 SHEETS—SHEET 2
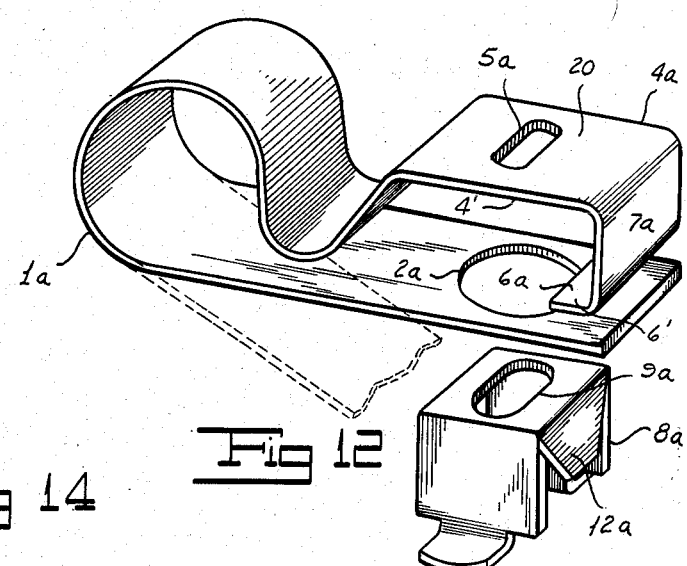
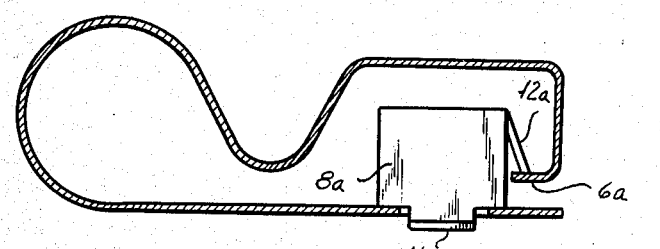
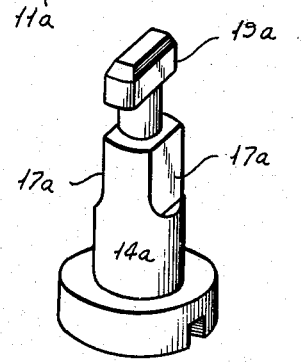
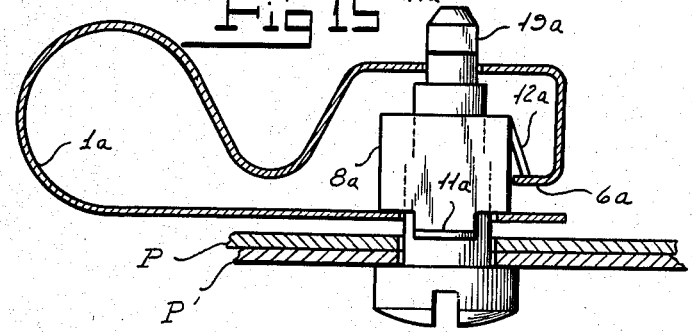
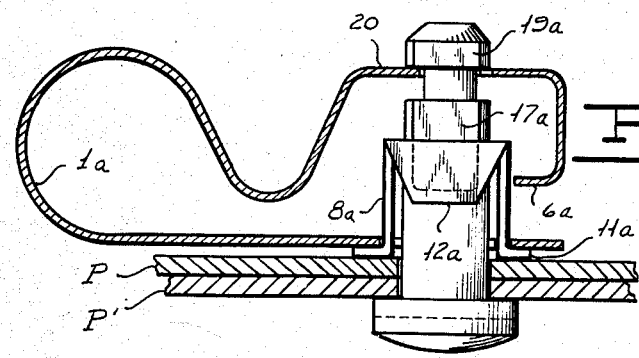
INVENTOR.
JACOB A. C. SILBERMAN
BY Cornelius Zabriskie
ATTORNEY Patented Apr. 15, 1952

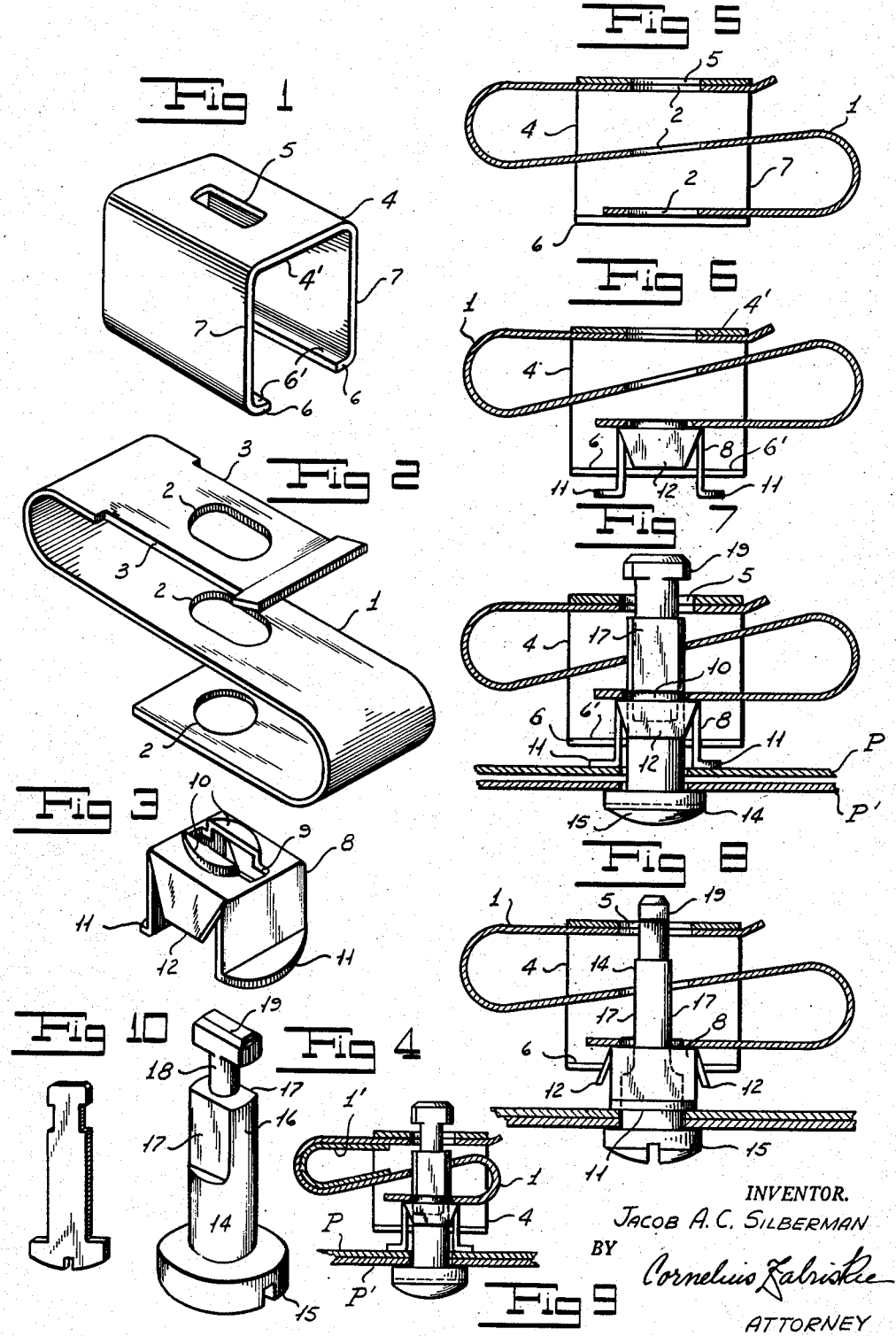

2,593,064

UNITED STATES PATENT OFFICE 2,593,064

FASTENER

Jacob A. C. Silberman, New York, N. Y.

Application March 19, 1949, Serial No. 82,409

12 Claims. (Cl. 85—5)

This invention is a fastener and, while adapted for general use, is intended primarily to fasten structural sheets in facial engagement with one another in a simple and expeditious manner and without the employment of threaded bolts, rivets or other permanent means, the invention relating to that type of fastener wherein the plates are maintained in assembled relation under spring pressure.

Devices of this general character have been heretofore suggested. In the main they have consisted essentially of a tie member adapted to be manipulated by the operator to place a normally inactive spring under compression, so that the plates may be held together by the compression thus produced. The present invention differs from these prior devices in that the spring is preloaded, i. e., placed under compression in excess of that required to properly bind the plates together and the tension member is operable, when the parts of the device are in assembled relation with respect to the plate, to release the spring from the means which normally holds it in its fully loaded condition, so that the compression of the spring may be applied to the tie member for the purpose of clamping the plates together. The present invention thus operates on a principle directly contrary to well known prior devices of this general type. The use of a pre-loaded spring has many advantages. It facilitates the application of the fastener to the plates to be clamped together and it permits the use of a stronger spring than heretofore while making the parts easier to assemble and operate.

Speaking generally, the fastener of this invention includes, as structural elements, a spring, a retainer, a trigger member and a tie member, hereinafter referred to as a bolt. In one of its preferred forms, the spring is a leaf spring having a plurality of convolutions normally held under preloaded compression through the interaction of the retainer and a trigger member, these parts being assembled with respect to one another so as to be handled as a unit. This unit is adapted to be placed on one side of the plates to be secured together while the bolt is passed through holes in the plates from the opposite side thereof and through alined holes and slots in the spring, retainer and trigger member. The shank of the bolt is made polygonal or flat to conform to a slot of like shape in the trigger member while the slot in the retainer is of a size to admit a T-shaped terminal head on the bolt during the mounting of the parts with respect to the plates. If the bolt is then rotated by the operator, the terminal slot of the bolt is moved across and out of register with the slot in the retainer to tie the whole assembly together while the trigger member is shifted with respect to the retainer so as to release the spring from its pre-loaded condition and transfer the compressive force of the spring on to the bolt for the purpose of clamping the plates together.

The retainer may be made separate from or integral with the spring, as hereinafter more fully described, while the trigger member may be in the form of a keeper serving the function of a spring tensioner prior to the assembly of these parts. The retainer and keeper should, however, be so constructed that, when rotated with respect to one another, they release the spring from its preloaded condition, so that the power of this spring may be imposed upon the bolt to tie the parts together.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Fig. 1 is a perspective view of the retainer housing of one form of fastener of this invention.

Fig. 2 is a like view showing a spring to cooperate therewith.

Fig. 3 is a like view of a keeper or tensioner for such spring.

Fig. 4 is a like view of the bolt adapted for cooperation with the structures of Figs. 1, 2 and 3.

Fig. 5 is a transverse section through the assembled spring and housing of Figs. 1 and 2.

Fig. 6 is a like view showing the retainer, spring and keeper assembled as a unit.

Fig. 7 shows this unit and associated bolt assembled with respect to two plates to be clamped together with the spring under initial loading.

Fig. 8 is a view similar to Fig. 7, but illustrating parts with the spring released to clamp the plates together.

Fig. 9 is a view similar to Fig. 8, but showing the spring reinforced with an extra leaf.

Fig. 10 is a perspective view showing how the bolt may be made as a sheet metal stamping.

Fig. 11 is a perspective view of a modified form of the invention wherein the spring and retainer are integral with one another.

Fig. 12 shows one form of keeper appropriate to the structure of Fig. 11.

Fig. 13 shows the bolt to be used with this construction.

Fig. 14 is a transverse section through the spring and housing of Fig. 11 assembled with the keeper, shown in elevation as a unit.

Fig. 15 shows the unit of Fig. 14 assembled with the bolt of Fig. 13 and the two plates to be clamped together, but with the spring under initial loading.

Fig. 16 shows the structure of Figs. 11–15 in a position to clamp the plates together.

Referring to the drawings, 1 indicates the spring. This spring is of the leaf type and it is bent or folded into substantially S-shape. It comprises a single leaf, although, if desired, there may be incorporated into each bend of the spring a supplemental leaf 1', as shown for example in Fig. 9. The several convolutions or spaced folds of the spring are provided with openings or holes 2 which may be circular or elongated. It is preferred, however, to make two of them slightly elongated so as to permit the spring to more easily flex without binding the bolt to be passed therethrough. The lateral edges of the upper convolution or fold are recessed as at 3 to center this spring when it is positioned within the housing or retainer 4.

The housing 4 is resilient and of substantially inverted U-shaped cross section. It is provided in its top with an elongated slot 5, is opened at both ends and is provided along its lower edges with inturned parallel flanges 6. This housing is preferably made from sheet metal suitably hardened and tempered so that its lateral walls 7 may be sprung apart. When sprung apart, the free edges of the flanges 6 recede from one another, but return to the normal position shown when the force causing this springing operation is relieved. The depth of the housing 4 is considerably less than the height of the spring 1 when the latter is uncompressed. When the spring is compressed manually or by the use of suitable tools, this spring may be positioned within the housing as shown in Fig. 5 and, when thus positioned, the recesses 3 will center the spring within the housing, with the upper convolution of the spring bearing against the under side of the top of the housing which forms a restraining abutment 4' and the bottom convolution of the spring bearing upon the upper faces of the flanges 6, which also form restraining abutments 6'.

It will be noted that the housing 4 is bent at its upper corners on the arc of a circle and this slight bending causes the recesses 3 of the spring to interfit with the housing and maintain the spring centered. The recesses are shown somewhat deeper in the drawings than is necessary, but the width of the spring should be substantially equal to the interior width of the housing so that the spring can be slipped in through either end of the housing into the assembled relation shown in Fig. 5 when said spring is placed under sufficient tension to collapse it to a dimension less than the interior height of the housing.

The keeper or trigger member 8 is formed from sheet metal and preferably hardened through appropriate heat treatment. It is of substantially box-like form and is provided in its top with an elongated slot 9 formed in an upstanding boss 10 adapted to fit into the lowermost hole 2 of the spring and function as a pilot when assembling the parts. The opposite side walls of the keeper are provided at their lower ends with flanges or feet 11, and at the two other sides of the keeper are formed downwardly diverging trigger flanges 12, the lateral edges of which are preferably tapered in a downward direction. These flanges 12 are of less height than the other two side walls of the keeper. The width of the top of the keeper in a direction normal to the flanges 12 is equal to substantially the distance between the free edges of the abutment flanges 6 of the housing 4 and the top plate of the keeper is square.

After the spring 1 has been placed within the housing 4 as shown in Fig. 5, the keeper is added to the assembly as shown in Fig. 6. This may be accomplished by slipping the keeper through the open end of the housing as shown, or the keeper may be pressed upwardly between the abutment flanges 6 of the housing, in which event the downwardly diverging trigger flanges 12 of the keeper will spring the flanges 6 apart until the trigger flanges 12 pass beyond the abutment flanges 6, whereupon the flanges 6 will spring back into position to underlie the lower edges of the trigger flanges 12. The trigger flanges then function as compression struts to place the spring under greater compression. The addition of the keeper to the assembly, as shown in Fig. 5, will in fact materially increase the loading of the spring, as shown in Fig. 6, so that it is placed under much greater compression than before, in fact more compression than is necessary to properly bind together the plates to be secured thereby.

As a result of the assembly of the parts as thus far described, there is produced the assembled unit of Fig. 6, ready for cooperation with the bolt of Fig. 4. To utilize this unit and the bolt of Fig. 4 in the clamping of the two plates P and P' to one another, the unit is positioned with the feet 11 thereof in engagement with the exposed surface of the plate P, with the keeper straddling alined holes in both plates. The bolt 14 shown in Fig. 4 is then passed through the holes in the plates, the slot 9 in the keeper, through the holes 2 of the spring and through the elongated slot 5 in the retainer, as shown in Fig. 8. To permit of this the bolt is provided with a main head 15 from which extends a shank 16. The opposite sides of this shank, intermediate its ends, are flattened as shown at 17, so that the cross section of this portion of the shank will substantially conform in shape and size to the slot 9 of the keeper. Beyond this flattened portion, the shank of the bolt is of reduced circular section, indicated at 18, and this circular section terminates in a terminal T-head, the horizontal cross sectional dimensions of which are substantially the same as those of the slot 5 of the housing. With this arrangement, the bolt 14 is free to pass upwardly through the openings in the several parts as stated and as shown in Fig. 7. When thus positioned, the keeper is locked to the bolt 14 against relative rotation, while the bolt is rotatable with respect to all of the other parts. The spring remains under its maximum loading between the upper abutment 4' and the keeper which is resting upon the lower abutments 6'.

If the retainer 4 is then grasped to keep it from turning and the bolt is rotated, the keeper will be rotated with it, and, as it is rotated, the diagonal dimension of the keeper 8 will cause the side walls 7 of the housing to be sprung apart, so that by the time the keeper has been rotated a little more than 45°, the trigger flanges 12 of the keeper will be disengaged from the abutments 6' of the flanges 6, with the result that the pressure of the spring will force the keeper downwardly and the housing upwardly and complete the rotation of the keeper through 90° into the position shown in Fig. 8. In this view the spring has expanded slightly so that the lower edges of the trigger flanges 12 are below the abutment flanges 6, as shown. The compression of the spring at this time will then be imposed in a downward direction upon the keeper to seat the feet 11 of the keeper firmly against the upper plate P, while the upward compression of the spring will be exerted against the terminal T-head 19 of the bolt to draw the bolt upwardly and clamp the plate P' firmly against the under surface of the plate P. The rotation of the bolt has at the same time rotated the terminal head 19 into angular relation with the slot 5 of the housing so that this head cannot be withdrawn from the slot 5. The rectilinear horizontal cross section of the keeper will lock the parts in this position against inadvertent retrograde movement, for the free edges of the flanges 6 of the housing will spring back into engagement with the keeper and lock it against rotation. It is to be noted that, although the spring expands somewhat during this operation, it remains under more than adequate compression to clamp the plates together. Should it be desired to release the fastener at any time, the housing may be held against rotation while the bolt is rotated through 90°. This will release the head 19 of the bolt from the slot 5 and rotate the keeper 8 and, inasmuch as the lower edges of the trigger flanges 12 are below the abutments 6', the unit assembly, consisting of the parts 1 and 4, may be lifted free and the bolt withdrawn from the keeper and plates.

In the structure illustrated in Figs. 11-16, the spring 1a is made of a somewhat different shape and the end of one of its leaves is formed into an integral retainer or housing 4a which corresponds to the housing 4. The horizontal portion 20 corresponds to the top surface of the housing 4 and is provided with an elongated slot 5a serving the function of the slot 5. Beyond the end of the portion 4a is a turned down portion 7a corresponding to one of the side walls 7 and having at its lower end an inturned flange 6a positioned adjacent the opening 2a which is in alinement with the opening 5a. The keeper 8a is the same as the keeper 8 except that it need not have a pilot boss. It may be provided with trigger flanges 12a corresponding to the flanges 12 at both sides although only one such flange is necessary to cooperate with the flange 6a. The bolt 14a is the same as the bolt 14, although it may be made somewhat shorter.

In utilizing the parts shown in this modified form, the keeper is assembled on the spring by positioning it between the upper and lower leaves of the spring and then pressing toward one another the two opposite side walls of the keeper which carry the feet 11a, so that said feet may be passed downwardly through the opening 2a, into the position shown in Fig. 14. The resilient character of the keeper will then cause the feet to spring apart and underlie the lower leaf of the spring. Downward pressure is then exerted upon the upper leaf of the spring and it is compressed until the abutment flange 6a passes beneath the trigger flange 12a, at which time the parts are assembled as shown in Fig. 14. The parts 1a and 8a may thereafter be handled as a unit with the spring 1a fully loaded, i. e., with the lower leaf of the spring moved from the uncompressed dotted line position of Fig. 11 to the full line position shown in that figure and in Fig. 14. At this time the trigger flange 12a will be under compression while the other two side flanges of the keeper will be under tension.

In utilizing this unit, it is positioned above the plates P and P' with the openings 2a and 5a in alinement with the openings in these plates. The bolt is then passed upwardly through these alined openings to position the flat sides 17a of the bolt shank in the slot 9a of the keeper and to pass the terminal head 19a of the bolt through the slot 5a of the upper leaf of the spring. The parts will then be loosely assembled as shown in Fig. 15. If the spring is then held against rotation about the axis of the bolt and the bolt thereupon turned through 90°, the terminal head 19a will be moved crosswise of the slot 5a and simultaneously the trigger flange 12a will be disengaged from the abutment flange 6a of the housing to release the spring from initial loading, so that the lower leaf of the spring may press the feet 11a of the keeper downwardly against the upper surface of the upper plate P, while the upper leaf of the spring will draw the bolt upwardly and thus draw the lower plate P' tightly against the lower face of the upper plate P. The parts will then be locked in assembled relation with the plates resiliently clamped together. To release the parts, the bolt is rotated through 90° to cause the trigger flange 12a to be disengaged from the abutment flange 6a. The head 19a will then register with the slot 5a of the spring so that the bolt may be removed and the plates separated.

It will be apparent from the foregoing description that in all cases the spring is held in preloaded condition by a trigger member which member is released or tripped through rotation of the bolt after the bolt has been rotated sufficiently to tie the most remote leaf of the spring to the most remote face of the plates to be clamped together. When the trigger member is tripped, as stated, the spring expands sufficiently to permit its power to be transferred from the trigger member to the tie and plates, while said spring remains under ample compression to tightly clamp the plates together.

In the accompanying drawings, I have shown two different shapes of leaf spring. These shapes are not exclusive as other shapes of spring may be employed and the spring may be centered, as in Figs. 1 to 8, or positioned off-center as in Fig. 9 or in Figs. 11-16. Moreover, I have described the bolts as shown in Figs. 4 and 13, although they may be stamped up from sheet metal as shown in Fig. 10 if so desired. In any event, the fasteners of this invention are under their normal condition of non-use, so constituted as to maintain the spring under loading in excess of that necessary to properly clamp the plates together. Thus the slight expansion of the spring necessary to effect clamping of the plates will still leave it under adequate compression to securely hold these plates in clamped relation. The parts which enter into the structures which I have described may be readily and economically manufactured without the use of complicated tools or dies and these parts may be easily and expeditiously assembled without any other tools than a screw driver or a wrench as the case may be, except in very large or heavy fasteners where it may be convenient to use a spring compressor to initially assemble the spring and keeper within the housing.

The fastener of this invention is highly efficient and is capable of exerting very considerable compression upon plates to be attached to one another. Where the fastener is to be used with plates, the bolts may be relatively short as shown, but it will be understood that the heavier structural members may be secured together in the same way by using longer bolts.

It should be clearly understood that when the plates are clamped together in the manner described, the compression force of the spring should be sufficient to maintain such plates in facial engagement with one another and the spring is made of sufficient weight or power to accomplish this result. There may be times, however, when sudden excess stresses or strains are placed upon the plates in a direction to force their separation that the power of the spring to hold the plates together may be momentarily overcome. Should such a situation occur, the structures which I have described provide a safety measure against permanent disengagement of the plates. The feet 11 or 11a act as safety elements under such conditions for, when the plates are in fully clamped condition as shown in Figs. 8 and 16, these feet will laterally overlap or extend beyond the abutment flanges of the retainer. Should an excessive force be applied sufficient to press the keeper upwardly, these feet will engage with the under sides of the flanges 6 of Figs. 1–9 and arrest further upward movement of the keeper or trigger member, so that it cannot be forced bodily upward into the interior of the housing or retainer and beyond the flanges 6 in which latter event, the spring would be locked against expansion and could not again clamp the plates together until the keeper was removed or rotated manually. Similarly in the construction of Figs. 11–16, the feet will engage under such excess force with the lower convolution of the spring 1a. Thus, in either form of the construction shown, the spring will force the keeper back into engagement with the plates and force the plates once more into face contacting relation as soon as the excess force has been relieved.

The foregoing detailed description sets forth the invention in its preferred practical forms, but the invention is to be understood as fully commensurate with the appended claims.

Having thus fully described the invention, what I claim as new and desire to secure by Letters Patent is:

1. A fastener for resiliently clamping together plates or the like comprising: a spring having a plurality of spaced overlapping folds, means for holding the spring under preloaded compression including a spring retainer and a rotatable trigger member coacting with the retainer to hold the spring under compression when in one position, the spaced overlapping folds of the spring, trigger member and plates having alined openings and the openings of the trigger member and retainer being in the form of elongated slots, and a bolt adapted to pass through all of said openings and provided at one end with a head to engage with the outermost plate and at the other end with a T-head adapted to engage with the slot of said retainer in released position of the trigger member and having an intermediate shank portion shaped to interfit with the slot of the trigger member whereby the rotation of the bolt will lock the retainer to the T-head while the trigger member will release the spring to transfer the compression thereof to the bolt to clamp the plates together.

2. A fastener for resiliently clamping together plates or the like comprising: a compression spring, a retainer embracing the spring in a direction to hold it under compression and having abutments at both ends with the abutment at one end bearing against the spring, a trigger member interposed between the spring and the abutment at the other end of the retainer for holding the spring under preloaded compression, said trigger member being disengageable from said latter abutment by rotation relative to the retainer, and a bolt having a head at each end and adapted to extend through the plates, spring, retainer and trigger member and rotatable with said trigger member to disengage the trigger member from the said latter abutment and release the spring when the bolt is rotated to transfer the compression of the spring to the bolt and clamp the plates together.

3. A fastener for resiliently clamping together plates or the like comprising: a compression spring, a retainer extending from one end of the spring to and beyond the other end thereof and there provided with an abutment, and a trigger member interposed between said abutment and the contiguous end of said spring to hold said spring under preloaded compression, said trigger member being rotatable to disengage it from said abutment, and a bolt adapted to extend through the trigger member and non-rotatably engage the same to rotate the trigger when the bolt is rotated, said bolt having heads at both ends between which the plates and the spring are confined.

4. A fastener for resiliently clamping together plates or the like comprising: a retainer having abutments at both ends, a folded compression spring between said abutments, a trigger member between the spring and the abutment at one end of the retainer to hold the spring under preloaded compression, said trigger member being disengageable from said abutment by rotation, and a bolt provided at its opposite ends with heads and adapted to extend through said retainer and through the trigger member and with means to lock said bolt against rotation with respect to said trigger member, whereby rotation of the bolt disengages the trigger member and permits the expansion of the spring to transfer its compression to the bolt and thus clamp the plates together.

5. A fastener for resiliently clamping together plates or the like comprising: a folded compression spring, a pair of members collectively holding said spring under preloaded compression, one of said members being a trigger member rotatable relative to the other to release the spring for expansion, and a bolt adapted to pass through the holes in the plates and through the spring and the rotatable member and with means to lock said bolt against rotation with respect to said trigger member, whereby rotation of the bolt releases the spring from the collective hold of said members and transfers its compression to the bolt to clamp the plates together, said bolt having heads at both ends between which the plates and the spring are confined.

6. A fastener for resiliently clamping together plates or the like comprising: a spring having a plurality of spaced folds, a housing provided with opposed abutments, one of which engages one terminal fold of the spring and the other abutment of which is normally spaced from the other terminal fold of said spring by an interposed trigger member adapted to be disengaged from the latter abutment by relative rotation between the trigger member and the housing, and a bolt adapted to pass through the plates, trigger member, spring and housing and with means to lock said bolt against rotation with respect to the trigger member, whereby rotation of the bolt disengages the trigger member from said abutment, said bolt having at its opposite ends heads to engage the outermost plate and the most distant end of the housing to hold the spring under compression and clamp plates together when the spring is released from its preloading compression by rotation of the trigger member.

7. A fastener for resiliently clamping together plates or the like comprising: a U-shaped housing provided along its open end with inturned abutment flanges, a keeper within the housing having trigger flanges bearing on said abutment flanges and disengageable therefrom by rotation of the keeper, a spring interposed between the keeper and the closed end of the housing under preloaded compression, and a bolt adapted to pass through alined openings in the plates, spring, housing and keeper and lock against rotation to the keeper, whereby rotation of the bolt disengages the trigger flanges of the keeper from the abutment flanges of the housing and releases the spring for expansion, the bolt being provided at opposite ends with heads engaging the outer end of the housing and the most remote plate to hold them against separation with the spring under sufficient tension to clamp the plates together.

8. A fastener for resiliently clamping together plates or the like comprising: a U-shaped housing provided along its open end with inturned abutment flanges, a keeper within the housing having trigger flanges bearing on said abutment flanges and disengageable therefrom by rotation of the keeper, a spring interposed between the keeper and the closed end of the housing under preloaded compression, and a bolt adapted to pass through alined openings in the plates, spring, housing and keeper and lock against rotation to the keeper, whereby rotation of the bolt disengages the trigger flanges of the keeper from the abutment flanges of the housing and releases the spring for expansion, the bolt being provided at opposite ends with heads engaging the outer end of the housing and the most remote plate to hold them against separation with the spring under sufficient tension to clamp the plates together, said housing and keeper being of interfitting cross section and the housing being resilient to preclude inadvertent disengagement of the trigger flanges from the abutment flanges but to yield and permit forced rotation of the keeper by the bolt.

9. A fastener for resiliently clamping together plates or the like comprising: a substantially U-shaped rectangular housing provided along its free ends with inturned abutment flanges, a spring with a plurality of spaced folds positioned within said housing between the base of the housing and the abutment flanges, a substantially rectangular keeper also positioned within the housing and having trigger flanges seated on the abutment flanges to space the contiguous fold of the spring from said abutment flanges and place the spring under preloaded compression, said keeper having side flanges extending out of the housing between the contiguous edges of the abutment flanges and normally holding said keeper against rotation, said keeper being rotatable by force sufficient to spring apart the opposite sides of the housing, and a bolt adapted to pass through openings in the plates, keeper, spring and housing, the openings in the keeper and housing being in the form of elongated slots, and the bolt having cooperating portions of corresponding cross section, whereby rotation of the bolt rotates the keeper to release the spring from preloaded compression and locks the housing to the plates, said bolt having heads at both ends between which the plates and the spring are confined.

10. A fastener for resiliently clamping together plates or the like comprising: a housing embodying a rectangular sheet of resilient metal bent into substantially inverted U-shaped cross section with a flat base, substantially flat side walls and inturned abutment flanges at the free ends of said side walls, a substantially S-shaped spring extending through the open sides of said housing with its lateral edges recessed to center the spring within the housing, a keeper extending into the housing between said flanges and having downwardly divergent trigger flanges resting on the abutment flanges to hold the spring under preloaded compression, the side walls of the housing being adapted to be sprung apart by forcible rotation of the keeper to disengage the trigger flanges from the abutment flanges and permit the expansion of the spring, and a bolt adapted to be passed through openings in the plates and through alined openings in the keeper, spring and housing with different portions of the length of the bolt shaped to interlock with the keeper and the housing, and said bolt being provided with heads at both ends whereby rotation of the bolt will disengage the trigger flanges from the abutment flanges and lock the bolt to the housing.

11. A fastener for resiliently clamping together plates or the like comprising: a substantially U-shaped rectangular housing provided along its free ends with inturned abutment flanges, a spring with a plurality of folds positioned within said housing between the base of the housing and the abutment flanges, a substantially rectangular keeper also positioned within the housing and having trigger flanges seated on the abutment flanges to space the contiguous fold of the spring from said abutment flanges and place the spring under preloaded compression, said keeper having side flanges extending out of the housing between the contiguous edges of the abutment flanges and normally holding said keeper against rotation, said keeper being rotatable by force sufficient to spring apart the opposite sides of the housing, and a bolt having heads at both ends and adapted to pass through openings in the plates, keeper, spring and housing, the openings in the keeper and housing being in the form of elongated slots, and the bolt having cooperating portions of corresponding cross section, whereby rotation of the bolt rotates the keeper to release the spring from preloaded compression and lock the housing to the plates, said side flanges of the keeper having laterally extending feet exteriorly of the housing to preclude the forcing of the keeper entirely into the housing under excess pressure tending to separate the clamped plates from one another.

12. A fastener for resiliently clamping together plates or the like comprising: a spring having a plurality of spaced folds, a U-shaped retainer retaining one fold of the spring, said retainer having an abutment flange, a rotatable trigger interposed between said flange and the other fold of said spring to normally maintain said spring under preloaded compression, and a tie bolt extending through alined holes in the spring, retainer and trigger and adapted to also pass through alined holes in the plates to be clamped together, means for locking said bolt and trigger together for rotation to release the trigger and permit expansion of the spring when the bolt is rotated, and heads on both ends of the bolt to confine the spring and plates between said heads, in trigger released position.

JACOB A. C. SILBERMAN.

REFERENCES CITED

The following references are of record in the file of this patent:

FOREIGN PATENTS

| Number | Country | Date |
|---|---|---|
| 496,728 | France | Nov. 14, 1919 |